C. Bates,
Bread Machine,
Nº 56,877. Patented Aug. 7, 1866.
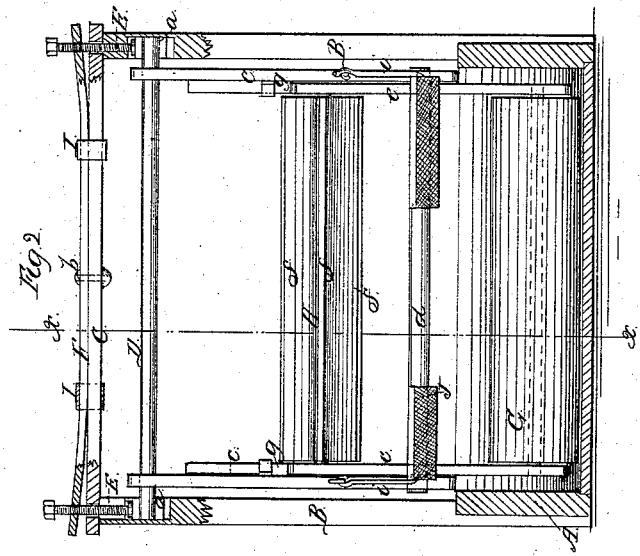
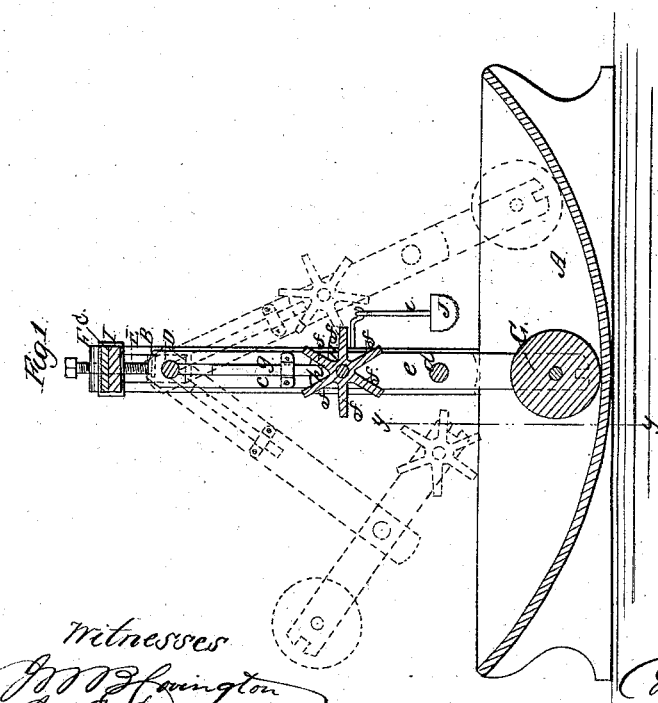
Witnesses
J.W. Harrington
Jas. A. Service
Inventor
Caleb Bates
Per Munn & Co
Attorneys

UNITED STATES PATENT OFFICE.

CALEB BATES, OF KINGSTON, MASSACHUSETTS.

IMPROVED CRUSHING, ROLLING, AND KNEADING MACHINE.

Specification forming part of Letters Patent No. 56,877, dated August 7, 1866.

*To all whom it may concern:*

Be it known that I, CALEB BATES, of Kingston, in the county of Plymouth and State of Massachusetts, have invented a Machine for Kneading Dough, Working Butter, and for other purposes; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\,x$, Fig. 2; Fig. 2, a transverse vertical section of the same, taken in the line $y\,y$, Fig. 1.

Similar letters of reference indicate like parts.

This invention relates to a new and improved machine for kneading dough, working butter, rolling pie-crust, and other similar purposes.

The invention consists in the employment or use of a swinging and a reversible frame provided with a smooth and a corrugated or flanged roller, and also with a flour and salt sprinkler, the swinging frame having a spring applied to it, and all arranged to operate in the manner substantially as hereinafter set forth.

A represents a trough or receptacle, in which the dough, butter, or other article to be operated upon is placed. This trough or receptacle is constructed with a bottom of curved form, a longitudinal section of which is a portion of a circle. This trough or receptacle has an upright, B, attached to each side of it, the upper ends of which are connected by a cross-bar, C, and the upper ends of the uprights B are grooved at their inner sides to receive bearings $a$ of a shaft, D, said bearings having the lower ends of screws E fitted in them in such a manner that they may turn in them and raise or lower the bearings, and consequently the shaft D, the screws E passing loosely through the cross-bar C, and working in female screws made in holes near the ends of a spring, F, secured to the upper surface of the cross-bar C by a central bolt, $b$. (See Fig. 2.)

On the shaft D there are fitted two pendent bars, $c\,c$, which constitute a swinging frame, and between these bars, at or near their lower ends, there is fitted a shaft, $d$, on which two bars, $e\,e$, are fitted centrally and loosely, so as to be capable of turning thereon; or said bars may be keyed on shaft $d$, and the ends of the latter allowed to turn in the bars $c\,c$. Between these bars $e\,e$, near one end, a roller, G, is fitted, having a smooth periphery, and between said bars, near their opposite ends, a roller, H, is fitted, having a corrugated or fluted periphery, or formed with radial flanges $f$, as shown clearly in Fig. 1.

The bars $e\,e$ form a reversible frame, as they may be turned so that either end will be downward, and either of the rollers G H moved as desired, the uprights being retained in position with either roller downward by means of sliding keys or bars $g$ at the inner sides of the bars $c\,c$, fitting in notches $h$ in the ends of the bars $e\,e$. (See Fig. 1.)

The bottom of the receptacle A is a portion of a circle of which the shaft D is the centre. Hence the lower roller, by swinging the bars $c\,c$ back and forth by hand, will pass over the dough or other substance in A from one end to the other, and the spring F subjected to the same tension throughout the entire movement of the roller; and the spring may be made to have a greater or less degree of tension or pressure by adjusting the screws E and slides I, which encompass the spring and the cross-bar C.

For rolling pie-crust and kneading dough the smooth roller G may be used, and for working butter the corrugated or flanged roller H would be preferable, and in cases where the rollers are not required to yield or give in the least the slides I are moved to the ends of the spring F and cross-bar C'.

J is a perforated trough or receptacle, suspended by rods $i\,i$ to one side of the bars $c\,c$. This perforated trough or receptacle is designed to contain flour or salt, the flour being used when dough is being kneaded or pie-crust rolled, in order to prevent it from sticking to the receptacle and roller, and the salt used when butter is being worked, the swinging motion of the bars $c\,c\,e\,e$ causing the flour or salt to be properly discharged through the perforations of J.

This device has been practically tested, and has been found to answer admirably well, performing the work efficiently and very expeditiously with but a moderate expenditure of labor.

Having thus described my invention, I claim as new and desire to secure by Letters Patent—

1. The swinging bars $c\,c$, provided with the reversible bars $e\,e$, containing the rollers G H, and arranged as shown, to admit of either roller G H being used, as the nature of the work may require, substantially as and for the purpose set forth.

2. The slides I I, in combination with the spring F and screws E, as and for the purpose set forth.

3. The perforated receptacle J, applied to the bars $c\,c$, in combination with the reversible bars $e\,e$ and rollers G H, substantially as and for the purpose specified.

4. The combination of the receptacle A, provided with a curved bottom, in combination with the bars $e\,e$, rollers G H, and swinging bars $c\,c$, all arranged to operate substantially in the manner and for the purpose set forth.

CALEB BATES

Witnesses:
WM. F. MCNAMARA,
ALEX. F. ROBERTS.